United States Patent [19]

Takahashi

[11] Patent Number: 5,019,979
[45] Date of Patent: May 28, 1991

[54] CONTROL FOR AUTOMATIC TRANSMISSION

[75] Inventor: Hiroshi Takahashi, Zushi, Japan

[73] Assignee: Nissan Motor Co., Ltd., Yokohama, Japan

[21] Appl. No.: 309,442

[22] Filed: Feb. 13, 1989

[30] Foreign Application Priority Data

Feb. 12, 1988 [JP] Japan ............................ 63-30659

[51] Int. Cl.$^5$ ...................... B60K 41/18; G05D 17/02
[52] U.S. Cl. ..................................... 364/424.1; 74/866
[58] Field of Search ............... 364/424.1, 807; 74/866

[56] References Cited

U.S. PATENT DOCUMENTS

| | | | |
|---|---|---|---|
| 4,262,335 | 4/1981 | Ahlen et al. | 364/424.1 |
| 4,285,252 | 8/1981 | Yamaki et al. | 74/866 |
| 4,335,428 | 6/1982 | Miki et al. | 364/424.1 |
| 4,353,272 | 10/1982 | Schneider et al. | 74/859 |
| 4,361,060 | 11/1982 | Smyth | 74/866 |
| 4,380,048 | 4/1983 | Kishi et al. | 364/424.1 |
| 4,393,467 | 7/1983 | Miki et al. | 364/424.1 |
| 4,517,646 | 5/1985 | Magnusson et al. | 364/424.1 |
| 4,630,508 | 12/1986 | Klatt | 74/866 |
| 4,713,764 | 12/1987 | Klatt | 364/424.1 |
| 4,769,774 | 9/1988 | Narita et al. | 364/424.1 |
| 4,777,585 | 10/1988 | Kokawa et al. | 364/164 |
| 4,809,175 | 2/1989 | Hosaka et al. | 364/424.01 |
| 4,841,815 | 6/1989 | Takahashi | 364/424.1 |

OTHER PUBLICATIONS

King et al.: The Application of Fuzzy Control Systems to Industrial Processes, Automatica, vol. 13, 1977, pp. 235-242.

Tong: Synthesis of Fuzzy Models for Industrial Processes, Int. Journal General Systems, 1978, vol. 4, pp. 143-162.

Lofti A. Zadeh, "Making Computers Think Like People", IEEE Spectrum, Aug. 1984, pp. 26-32.

Primary Examiner—Felix D. Gruber
Attorney, Agent, or Firm—Foley & Lardner

[57] ABSTRACT

A fuzzy-logic controlled automatic transmission of a motor vehicle comprises a series of detectors for detecting parameters indicative of running conditions which the motor vehicle is involved in and generating a series of detector signals indicative of the parameters detected, a fuzzy-logic controller which contains a series of rules of thumb, each being expressed by a series of membership functions of the detector signals and recommending an action which the automatic transmission should take. In the fuzzy-logic controller, the series of rules of thumb are tested one after another based on the detector signals to determine the degrees to which the series of rules of thumb are satisfied, and a position which the automatic transmission should take is determined in response to the degrees determined. An output signal is generated by the fuzzy-logic controller which is indicative of the position determined. A modifier is provided which changes or modifies at least one of the series of membership functions of at least one of the series of rules of thumb when the history of at least one of the series of detector signals shows a predetermined state.

6 Claims, 8 Drawing Sheets

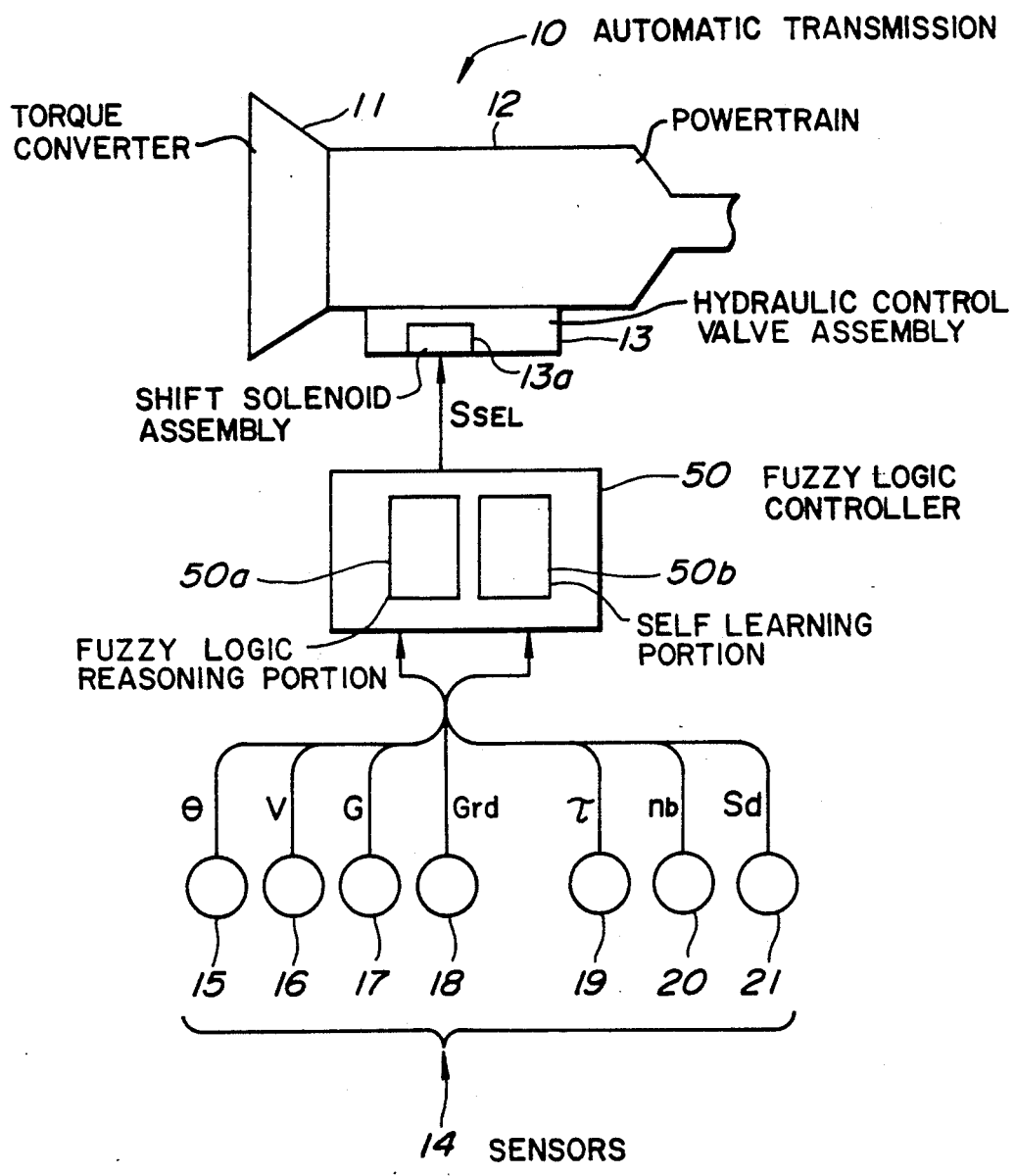

FIG.2

| RULE OF THUMB | IF $\theta$ | AND $\dot{\theta}$ | V | G | Grd | $\tau$ | nb | Sd | Pb | THEN RECOMMENDED ACTION |
|---|---|---|---|---|---|---|---|---|---|---|
| #1 | MS | MM | S | MB | MM | MS | MM | MM | S | 1-2 UPSHIFT |
| #2 | MM | MM | MM | MM | MS | MM | MS | MS | S | 2-3 UPSHIFT |
| #3 | MB | MM | MB | MS | S | MB | S | S | S | 3-4 UPSHIFT |
| #4 | MM | MM | MM | MS | S | MM | MS | MS | MS | 4-3 DOWNSHIFT |
| #5 | MS | MM | MS | MS | MM | MS | MM | MS | MM | 3-2 DOWNSHIFT |
| #6 | S | MM | S | MM | MB | S | MB | MM | MB | 2-1 DOWNSHIFT |
| #7 | MS | MS | S | S | S | MS | B | MB | B | 1 ST.SP.HOLD |
| #8 | MM | MS | MS | S | S | MM | MB | MM | MB | 2 ND.SP.HOLD |
| #9 | MS | MS | MB | S | S | MS | MM | MS | S | 3 RD.SP.HOLD |
| #10 | S | MS | B | S | S | S | MS | S | S | 4 TH.SP.HOLD |
| #11 | MS | S | B | S | S | MS | S | S | S | 4-4' UPSHIFT |
| #12 | MS | MB | B | S | S | MS | S | S | S | 4'-4 DOWNSHIFT |
| #13 | MS | S | B | S | S | MS | S | S | S | 4' TH.SP.HOLD |

4' OF 4" TH. SP. REPRESENTS THE FOURTH SPEED WITH A LOCK-UP CLUTCH ENGAGED.

FIG.10
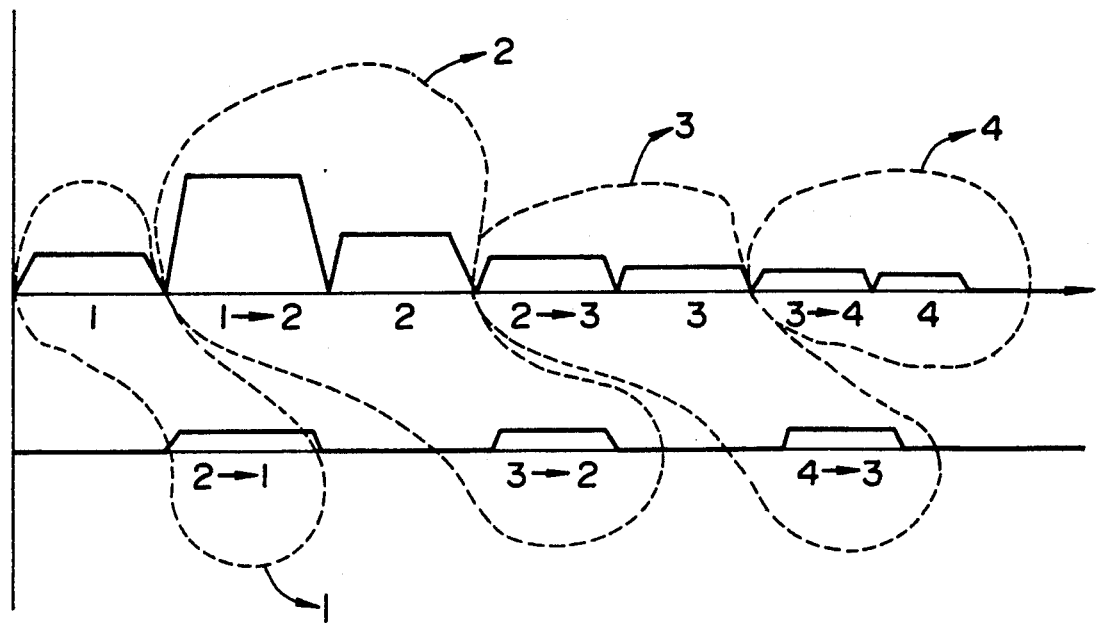
FIG.11
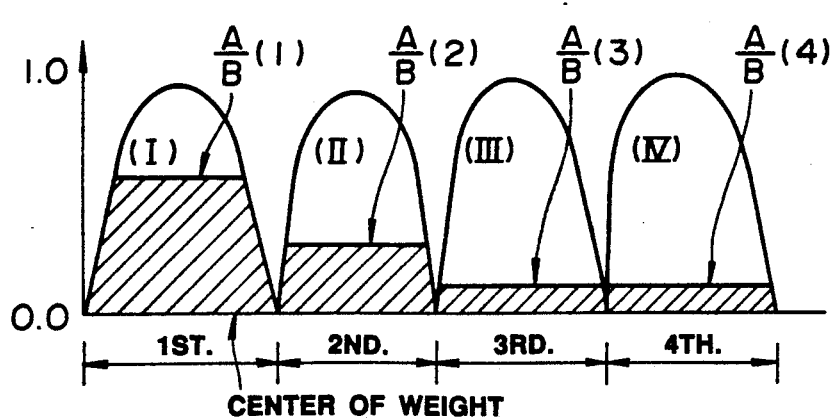
FIG.12

CONTROL FOR AUTOMATIC TRANSMISSION

BACKGROUND OF THE INVENTION

The present invention relates to a control apparatus for an automatic transmission of a motor vehicle, and a method of controlling an automatic transmission of a motor vehicle.

Recently, there is a growing demand on more precision and finer control of the shift characteristic of an automatic transmission.

There is known a control apparatus for an automatic transmission which employs a microcomputer based controller. The controller stores data in the form of maps relating to various kinds of shift patterns including a power pattern where an acceleration performance is emphasized and an economy pattern where a fuel economy is emphasized. Sensor output signals from a throttle sensor and a vehicle speed sensor are supplied to the controller. Based on the sensor signals, the controller performs a select operation among the above-mentioned maps and then a table look-up operation of the map selected to retrieve transmission ratio data arranged in the map versus throttle opening degree and vehicle speed to obtain a transmission ratio fit to a set of a throttle opening degree and a vehicle speed indicated by the sensor signals. The controller generates a shift signal indicative of the transmission ratio obtained. In this manner, a fine selection among transmission ratios is made to determine a transmission ratio most suitable for a running state which an automobile is involved in, since there are provided various shift patterns as mentioned above.

With the known control system, the plurality of maps are provided and selected in accordance with various running states which the automobile may be involved in, and there occur events where a shift between transmission ratios is made in accordance with an inappropriate shift schedule which is not fit to the running state of the vehicle. This is where an improvement is to be made. If all shift points fit for all available running states of the vehicle were to be set, the number of maps would be considerably increased. Therefore, it is the common practice to limit the number of shift patterns, each fit to one of representative running conditions.

Applicant of the present application has proposed in a copending U.S. patent application Ser. No. 07/175,350 filed on Mar. 30, 1988, now U.S. Pat. No. 4,841,815, a fuzzy-logic controlled automatic transmission. According to this previously proposed control, a fuzzy-logic is used in order to determine a transmission ratio suitable for vehicle running conditions. In the fuzzy-logic controller, a series of membership functions are referred to based on a series of signals represenitve of the running conditions. The membership functions are fixed once they are set, so that it is impossible to provide a shift characteristic with a sufficient flexibility to cope with different driver's driving behaviours and different environments which the motor vehicle may be involved in.

Therefore, an object of the present invention is to improve a control apparatus for an automatic transmission such that a shift characteristic in the automatic transmission is flexible enough to cope with different driver's driving behaviours and different environments which the motor vehicle may be involved in.

SUMMARY OF THE INVENTION

According to one aspect of the present invention, there is provided a control apparatus for an automatic transmission of a motor vehicle, comprising:
  a series of detector means for detecting parameters indicative of running conditions which the motor vehicle is involved in and generating a series of signals indicative of said parameters detected;
  means for containing a series of rules of thumb, each being expressed by a series of membership functions of said signals and recommending an action which the automatic transmission should take;
  means for testing said series of rules of thumb one after another based on said signals to determine the degrees to which said series of rules of thumb are satisfied;
  means for determining a position which the automatic transmission should take in response to the degrees determined and generating an output signal indicative of the position determined; and
  means for modifying at least one of said series of membership functions of at least one of said series of rules of thumb when the history of at least one of said series of signals shows a predetermined state.

Another specific aspect of the present invention resides in providing a control apparatus for an automatic transmission of a motor vehicle, comprising:
  a series of detector means for detecting parameters indicative of running conditions which the motor vehicle is involved in and generating a series of signals indicative of said parameters detected;
  means for containing a series of rules of thumb, each being expressed by a series of membership functions of said signals and recommending an action which the automatic transmission should take;
  means for testing said series of rules of thumb one after another based on said signals to determine the degrees to which said series of rules of thumb are satisfied;
  means for determining a position which the automatic transmission should take in response to the degrees determined and generating an output signal indicative of the position determined;
  means for sampling each of said series of signals and calculating a variance of the data sampled for each of said series of signals;
  means for comparing the variance of the data sampled for each of said series of signals with a predetermined reference; and
  means for modifying at least one of said series of membership functions of at least one of said series of rules of thumb when the variance is less than said predetermined reference.

Another aspect of the present invention reside in providing a method of controlling an automatic transmission of a motor vehicle, comprising the steps of:
  detecting parameters indicative of running conditions which the motor vehicle is involved in and generating a series of signals indicative of said parameters detected;
  providing a series of rules of thumb, each being expressed by a series of membership functions of said signals and recommending an action which the automatic transmission should take;
  testing said series of rules of thumb one after another based on said signals to determine the degrees to which said series of rules of thumb are satisfied;

determining a position which the automatic transmission should take in response to the degrees determined and generating an output signal indicative of the position determined; and modifying at least one of said series of membership functions of at least one of said series of rules of thumb when the history of at least one of said series of signals shows a predetermined state.

A further aspect of the present invention resides in providing a method of controlling an automatic transmission of a motor vehicle, comprising the steps of:

detecting parameters indicative of running conditions which the motor vehicle is involved in and generating a series of signals indicative of said parameters detected;

providing a series of rules of thumb, each being expressed by a series of membership functions of said signals and recommending an action which the automatic transmission should take;

testing said series of rules of thumb one after another based on said signals to determine the degrees to which said series of rules of thumb are satisfied;

determining a position which the automatic transmission should take in response to the degrees determined and generating an output signal indicative of the position determined;

sampling each of said series of signals and calculating a variance of the data sampled for each of said series of signals;

comparing the variance of the data sampled for each of said series of signals with a predetermined reference; and modifying at least one of said series of membership functions of at least one of said series of rules of thumb when the variance is less than said predetermined reference.

BRIEF DESCRIPTION OF THE DRAWINGS

FIG. 1 is a block diagram of a control apparatus for an automatic transmission of an automobile according to the present invention;

FIG. 2 is a table illustrating a series of rules of thumb contained in the control apparatus shown in FIG. 1;

FIG. 10 illustrates all of the recommended action support functions, which have been sliced, related to four different shift positions with four different transmission ratios;

FIG. 11 is a simplified diagram illustrating how to determine the ratio of area remaining resulting from slicing recommended action support functions to the whole area of them prior to slicing; and FIG. 12 is a diagram illustrating four transmission position or shift position support functions which have been sliced with the results obtained in a manner as illustrated in FIG. 12.

DETAILED DESCRIPTION OF THE INVENTION

Figure 3:
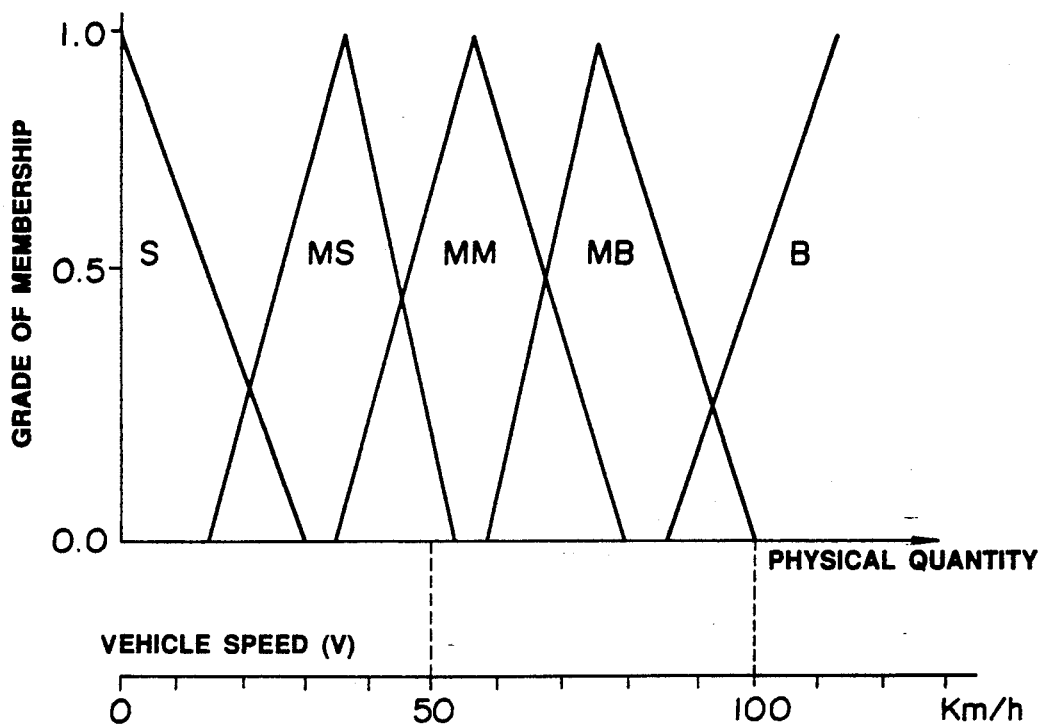
FIG. 3 is a diagrammatic view of membership functions of a physical quantity, for example the vehicle speed V.

Referring to FIGS. 1 to 12, an embodiment of a control apparatus according to the present invention is described wherein the present invention is applied to an automobile installed with a four speed automatic transmission including a torque converter with a lock-up clutch.

Referring to FIG. 1. an automatic transmission is generally denoted by the reference numeral 10. The automatic transmission includes a torque converter 11 with a lock-up clutch and a powertrain 12. The powertrain 12 is shiftable between four forward speeds providing different transmission or gear ratios, and a reverse under the control of a hydraulic control valve assembly 13 including a shift solenoid assembly 13a. A corresponding one shift solenoid of the shift solenoid assembly takes ON/OFF position in response to a shift signal $S_{SEL}$ generated by a fuzzy-logic controller 50 later described. The shift signal is indicative of a transmission ratio which the powertrain should take.

A series of sensors, which is generally denoted by the reference numeral 14, are provided to detect the current running conditions of the vehicle. The series of sensors 14 include a throttle sensor 15 which detects a throttle opening degree $\theta$ of the engine which the torque converter 11 is operatively coupled with, a vehicle speed sensor 16 which detects a vehicle speed V, an acceleration sensor 17 which detects a longitudinal acceleration which the vehicle is subject to, a gradient sensor 18 which detects a longitudinal gradient Grd which the vehicle is subject to, a torque sensor 19 which detects an engine output torque $\tau$ (tau) (or an output shaft torque of the automatic transmission 10), a brake sensor 20 which generates an output signal indicative of the magnitude of force Pb which the brake pedal is depressed, and a distance sensor 21, such as a laser radar, which detects a distance Sd from the vehicle to oncoming distant object. From the output signal of the brake sensor 20, the frequency nb with which the brake pedal has been depressed is determined. The quality and quantity of the sensors are not limited to the above-mentioned example. For example, the acceleration sensor 17 may be eliminated if a first derivative, with respect to time, of vehicle speed V is used as the acceleration G. Further, the distance sensor 21 may be eliminated if the frequency with which the brake pedal has been manipulated is recognized from the output signal of the brake sensor 20 and this result is used to estimate the traffic flow condition.

The signals $\theta$, V, G, Grd, $\tau$ (tau), nb, and Sd are supplied to the before-mentioned fuzzy logic controller 50. The fuzzy-logic controller 50 includes an ordinary-use microcomputer or a specially designed hardware for executing fuzzy reasoning. The fuzzy-logic controller 50 may be devided into a fuzzy-reasoning portion 50a and a self-learning portion 50b. The fuzzy-reasoning portion 50a contains data base expressing membership functions which will be later described.

Before entering into the description of the fuzzy-reasoning portion 50a, the term "fuzzy logic" is briefly explained. It is a kind of logic using graded or qualified statements rather than ones that are strictly true or false. The results of fuzzy reasoning are not as definite as those derived by strict logic, but they cover a large field of discourse. "Fuzzy sets" are sets that do not have a crisply defined membership, but rather allow objects to have grades of membership from 0 to 1. A fuzzy set is defined by a membership function which translates an object into a grade of membership from 0 to 1. Fuzzy logic controls determine the motion or action of an object to be controlled by a number of rules of thumbs or control rules and are considered to be fit to situations which are difficult to be expressed by mathematical models.

In the present embodiment, the fuzzy reasoning portion 50a contains thirteen different rules of thumb or control rules #1 to #13 as shown in FIG. 2, each rule recommending an action which the automatic transmission should take based on the variety of parameters representative of the vehicle's running conditions. Each rule is expressed in the form, "if A, then B."

It is now described how the rules were made by the applicant. The applicant prepared a test car installed with an automatic transmission which is designed to make an upshift or a downshift when instructed by a driver in a driver's seat by his manipulating upshift and downshift switches provided near the driver's seat. A data recorder is mounted on the test car to record the parameters $\theta$, $\dot{\theta}$, V, G, Grd, $\tau$ (tau), nb, Sd, and Pb are recorded and a shift point at which the driver actually manipulated the shift switches during driving of the car. This kind of test is conducted under a variety of running conditions and by a plurality of test drivers having superior driving technique. The values of the variety of parameters at the instance when the shift actually took place are appropriately averaged in establishing the thirteen control rules #1 to #13 as shown in FIG. 3. "If clause" of each of the control rules is described by a logical AND of nine fuzzy sets expressed by nine membership functions having parameters $\theta$, $\dot{\theta}$, V, G, Grd, $\tau$ (tau), nb, Sd, and Pb. There are provided five membership functions for each physical quantity expressed by one of the variety of parameters. The membership functions are represented by linguistic variables like "small (abbreviated as S)," "medium small (abbreviated as MS)," "medium medium (abbreviated as MM)," "medium big (abbreviated as MB),"and "big (abbreviated as B)." "Then clause" of each of the rules is described by a function which gives a weight on an action recommended by the rule in response to the result of the "if clause" of the rule.

Figure 4:
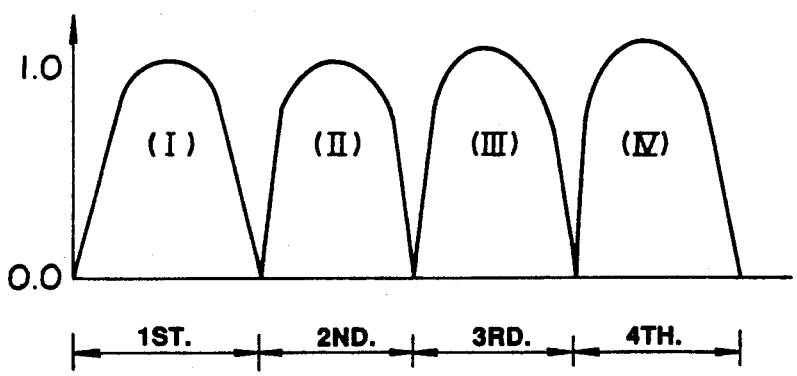
FIG. 4 is a diagrammatic view illustrating transmission position support functions (I), (II), (III) and (IV)

FIG. 3 illustrates the membership functions S, MS, MM, MB, and B versus a physical quantity, taking vehicle speed V as an example, where the vertical axis represents the grade of membership, while the horizontal axis the physical quantity. As readily seen from FIG. 3, the membership functions S, MS, MM, MB, and B are provided in this order as the physical quantity increases. In addition to the functions expressing the control rules, so-called transmission or shift position support functions as shown in FIG. 4 are stored, each for one of the plurality of shift positions.

Figure 5:
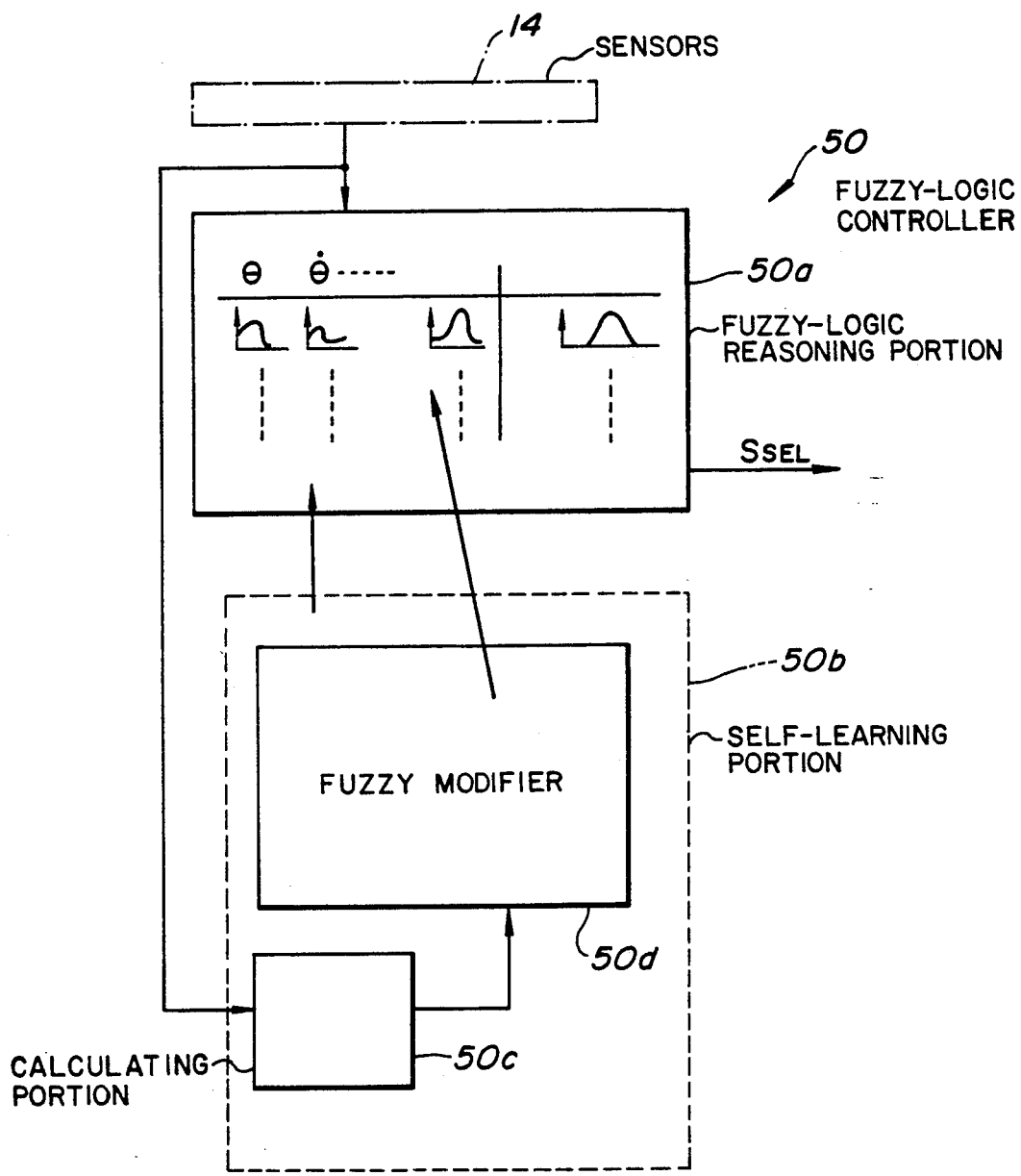
FIG. 5 is a block diagram illustrating operations of self-learning control to change or modify some of membership functions.

FIG. 5 diagrammatically shows the operational relationship between the fuzzy-reasoning portion 50a and the self-learning portion 50b. Briefly described, the self-learning portion 50b learns the driving behaviour of a driver and changes the membership function by spreading out the transition between full membership (1) and nonmembership (0) so as to provide shift characteristic which is fit to the driving of the driver. Thus, after a change, with the same physical quantity, the grade of membership increases as compared to that before the change. More specifically, the before-mentioned running condition representative parameters $\theta$, $\dot{\theta}$, V, G, Grd, $\tau$ (tau), nb, Sd and Pb are supplied also to the self-learning portion 50b at the calculating portion 50c where the average and variance of each of the parameters are calculated. For each of input data indicative of the parameters, a reference value is predetermined. If the variance of a particular input data becomes less than the reference value, it is understood that a particular trend appears in the driving behaviors of the driver, and a fuzzy modifier 50d of the self-learning portion 50b changes the membership function having as the variable the parameter which the particular input data is indicative of.

Before entering into the specific description of the self-learning operation, the operations to determine the transmission or shift position which the automatic transmission will actually take are described referring to FIGS. 8 to 12.

Figure 8:
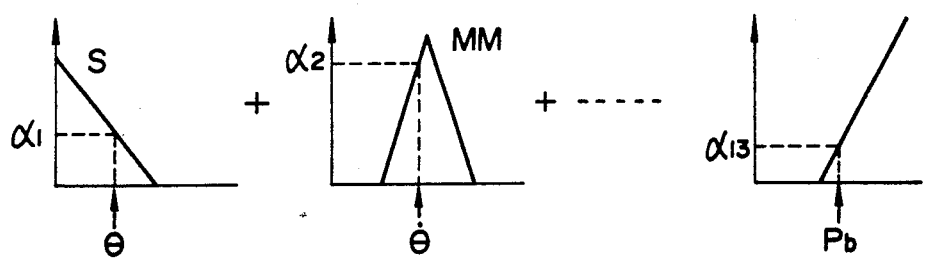
FIG. 8 illustrate how the membership functions expressing the "if-clause" of each of the rules of thumb are tested based on the series of parameters indicated by the detector or sensor signals.
Figure 9:
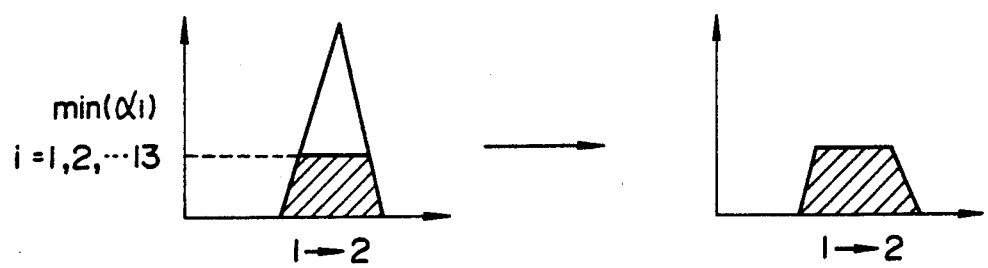
FIG. 9 illustrates a recommended action support function expressing the "then-clause" of each of the series of rules of thumb which has been sliced with the result of the logical sum operation of the "if-clause" of the rule of thumb.

Referring to FIG. 8, each if-clause is tested in turn by obtaining the grades of membership of all of the membership functions belonging to the if-clause versus the variety of signals $\theta$, $\dot{\theta}$, V, G, Grd, $\tau$ (tau), nb, Sd, and Pb. The grades of membership obtained are denoted by the characters $alpha_1$, $alpha_2$, ... $alpha_{13}$. Since if-clause is the logical sum of the grades of membership obtained, the minimum grade $min(\alpha_i)$ of all, where i represents one of values ranging from 1 to 13, is selected. With this minimum grade of membership obtained as a result from testing of each control rule, the action support function belonging to the then-clause of the rule is sliced or limited as shown in FIG. 9. The shadowed area of each of the action support function as shown in FIG. 9 expresses the degree to which each of the control rules is satisfied and the degree to which an action recommended by the control rule is weighted. FIG. 10 shows the remaining area of the action support function of each control rule after conducting test of each of the control rules except the control rules #11, #12, and #13. As shown in FIG. 10, the action support functions are divided into four groups, namely a group supporting a first speed transmission position, a group supporting a second speed transmission position, a group supporting a third speed transmission position, and a group supporting a fourth speed transmission position, and the total A(i) of the remaining areas of the action support functions of each group is calculated, where i represents the group. Then, as diagrammatically illustrated in FIG. 11, the ratio of the total of the remaining area A(i) to the total of area unlimited B(i) of the action supporting functions of each of the four groups is calculated. The ratios A(i)/B(i), namely A(1)/B(1), A(2)/B(2), A(3)/B(3), and A(4)/B(4), are used to limit or slice of shift position determination functions I, II, III, and IV as shown in FIG. 12. In FIG. 12, the shadowed area of each of the functions I, II, III, and IV indicates weight given to the shift position recommended. The shift positions are appropriately weighted, and the center of gravity is used to determine the shift position that the transmission will actually take. Thus, the fuzzy logic control 50 generates a shift position select signal $S_{SEL}$ indicative of the shift position determined. The automatic transmission then will take the shift position indicated by the signal $S_{SEL}$.

Figure 6:
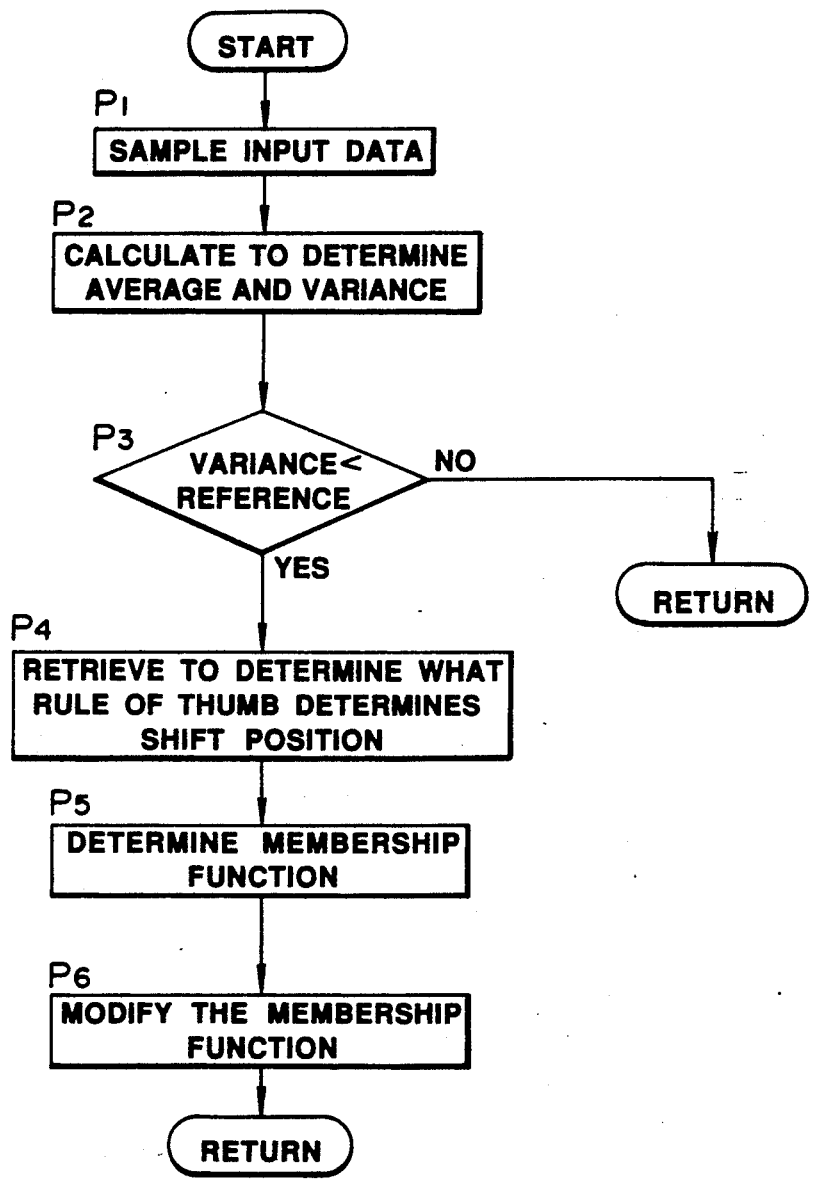
FIG. 6 is a flow diagram of the self-learning operations.

The operation of the self-learning portion 50b is now described specifically along with the flow diagram shown in FIG. 6.

Figure 7A:
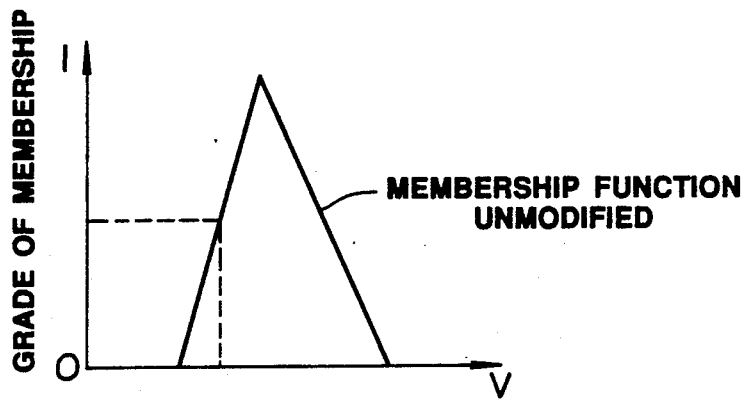
FIGS. 7(a), 7(b), and 7(c) illustrate how a membership function is modified and then further modified.
Figure 7B:
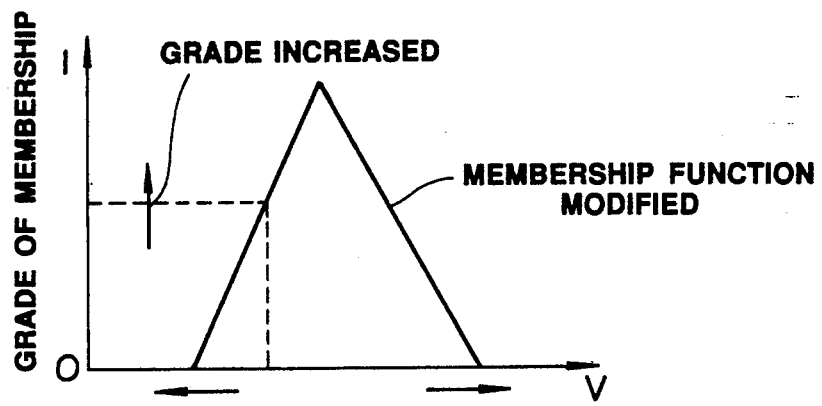
Figure 7C:
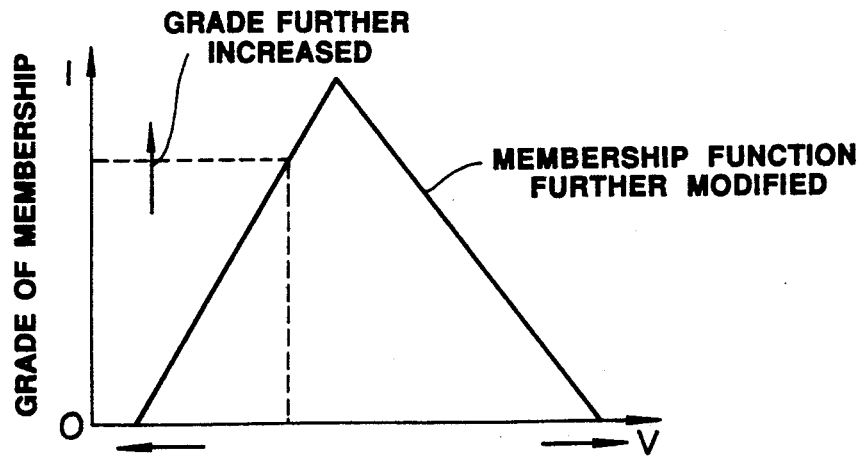

At a step $P_1$, the input data derived from the signals $\theta$, $\dot{\theta}$, V, G, Grd, $\tau$ (tau), nb, Sd, and Pb during a relatively short period of time are sampled. At a step $P_2$, the input data sampled are accumulated for a relatively long period of time, for example, 20 seconds, and the average and variance of each of the signals are calculated. At a step $P_3$, the variance of each signal is compared with the particular predetermined reference to the signal. If, at the step $P_3$, the variance is not less than the predetermined reference, the program comes to an end. If, at the step $P_3$, the variance is less than the predetermined reference, it is understood that the driving state has shown a particular trend and the program proceeds to a step $P_4$. At the step $P_4$, it is determined which one of the thirteen rules #1 to #13 has the greatest influence on the final decision made by the fuzzy logic controller 50 to select the current shift position. At a step $P_5$, among the membership functions of the control rule that was determined at the previous step $P_4$, there is selected a membership function of that input data which has its variance found to be less than the predetermined value at the previous step $P_3$. At a step $P_6$, the membership function that was selected at the previous step $P_5$ is modified by spreading out the transition between full membership and nonmembership so that with the same variable, the grade of membership increases. Let it be assumed now that the variance of the vehicle speed signal V becomes less than the predetermined reference, the vehicle is subject to crusing at a high constant speed and the control rule #13 has the greatest influence on the action taken by the fuzzy logic controller. In this case, the transition between the full membership and nonmembership of the membership function B in the control rule #13 is spread out gradually as shown in FIGS. 7(b) and 7(c), for example, by an amount corresponding to ±2 km/h. As will be readily understood from FIGS. 7(a), 7(b), and 7(c), with the same vehicle speed, the degree of membership increases as the membership function is modified as shown in FIG. 7(b) and further increases as the membership function is further modified as shown in FIG. 7(c). As a result, the tendency to maintain the current shift position increases. As will now be appreciated from the preceding description that the weight given to that one of the control rules which recommends the action that is actually taken by the fuzzy logic controller 50 is increased in order to reflect the driving behaviour of the driver.

If, for example, the control rule that reccomends the current shift position is strengthened by the self-learning mentioned above, there occurs a situation where, after cruising at a high constant speed for a long time, when the driver steps down the accelerator pedal with an intention to pass a vehicle, the transmission tends to maintain the current shift position, and thus the downshift timing is delayed. In order to solve this problem, the membership function that is subject to modification operations is reset to its unmodified shape when there is an input of data having its variance greater than a predetermined variance (2Q) that is twice as much as the ordinary variance (Q) that is represented by the predetermined reference. Thereafter, unless the supply of the data with its variance greater than the predetermined variance continues for a predetermined period of time, the membership function is changed to the modified one establihsed before the reset operation since the above-mentioned change in the input data is just temporary. The modification of the membership function as mentioned above is preferrable for improved driveability.

From the preceding description of the embodiment, it will now be appreciated that the fuzzy logic control accompanied by self learning gives an improved driveability as compared to the conventional control using a plurality of shift schedule maps. Let us now consider the case what will happen according to the conventional control mentioned above if the accelerator pedal is depressed by a small degree when the vehicle is climbing uphill along a road with approximately 5% at a speed 40 km/h with the third speed ratio and the throttle kept at a throttle opening degree of 40 degrees. According to the conventional control, the transmission downshifts from the third speed to the second speed immediately after the accelerator pedal is depressed, but will upshift to take the third speed again if the accelerator pedal is released subsequently. In contrast to this unsmooth running, according to the preceding embodiment, since the tendency to maintain the current shift position is gradually increased as the vehicle climbs uphill at the constant speed, the probability of occurrence of the above-mentioned undesirable downshift and the sebsequent upshift actions become smaller and smaller.

Referring back to FIG. 2, the membership function B is assigned to the signal nb in the control rule #7 that recommends the first speed hold action. As a result, if the frequency of brake pedal depression nb becomes big such as when the vehicle is involved in the traffic jam, the tendency of the transmission to hold the first speed ratio increases and thus the upshift point to the second speed ratio will less likely take place, thus resulting in improved driveability.

Besides, there are provided appropriate shift characteristics that are fit to different driving behaviours possessed by different drivers owing to the self-learning after monitoring the degree at which acceleration changes and/or the degree at which the throttle opening changes.

What is claimed is:

1. A control apparatus for an automatic transmission of a motor vehicle, comprising:
   a series of detector means for detecting parameters indicative of running conditions which the motor vehicle is involved in and generating a series of signals indicative of said parameters detected;
   a fuzzy-logic controller receiving said series of signals indicative of said parameters detected,
   said fuzzy-logic controller
     containing a series of rules of thumb, each being expressed by a series of membership functions of said signals and recommending an action which the automatic transmission should take,
     testing said series of rules of thumb one after another based on said series of signals to determine the degrees to which said series of rules of thumb are satisfied,
     determining a speed ratio position which the automatic transmission should take in response to the degrees determined and generating an output signal indicative of said speed ratio position determined, modifying at least one of said series of membership functions of at least one of said series of rules of thumb when the history of at least one of said series of signals shows a predetermined state, and means responsive to said output signal for shifting the automatic transmission to said speed ratio position determined by said output signal.

2. A control apparatus for an automatic transmission of a motor vehicle, comprising:

a series of detector means for detecting parameters indicative of running conditions which the motor vehicle is involved in and generating a series of signals indicative of said parameters detected;

a fuzzy-logic controller receiving said series of signals indicative of said parameters detected, said fuzzy-logic controller containing a series of rules of thumb, each being expressed by a series of membership functions of said signals and recommending an action which the automatic transmission should take, a fuzzy-logic controller receiving said series of signals indicative of said parameters detected, said fuzzy-logic controller testing said series of rules of thumb one after another based on said signals to determine the degrees to which said series of rules of thumb are satisfied, determining a speed ratio position which the automatic transmission should take in response to the degrees determined and generating an output signal indicative of said speed ratio position determined, sampling each of said series of signals and calculating a variance of the data sampled for each of said series of signals;

comparing the variance of the data sampled for each of said series of signals with a predetermined reference, modifying at least one of said series of membership functions of at least one of said series of rules of thumb when the variance is less than said predetermined reference, and means responsive to said output signal for shifting the automatic transmission to said speed ratio position determined by said output signal.

3. A method of controlling an automatic transmission of a motor vehicle, comprising the steps of:

detecting parameters indicative of running conditions which the motor vehicle is involved in and generating a series of signals indicative of said parameters detected;

providing a series of rules of thumb, each being expressed by a series of membership functions of said signals and recommending an action which the automatic transmission should take;

testing said series of rules of thumb one after another based on said signals to determine the degrees to which said series of rules of thumb are satisfied;

determining a speed ratio position which the automatic transmission should take in response to the degrees determined and generating an output signal indicative of the speed ratio position determined;

modifying at least one of said series of membership functions of at least one of said series of rules of thumb when the history of at least one of said series of signals shows a predetermined state; and shifting responsive to said output signal the automatic transmission to said speed ratio position indicated by said output signal.

4. A method of controlling an automatic transmission of a motor vehicle, comprising the steps of:

detecting parameters indicative of running conditions which the motor vehicle is involved in and generating a series of signals indicative of said parameters detected;

providing a series of rules of thumb, each being expressed by a series of membership functions of said signals and recommending an action which the automatic transmission should take;

testing said series of rules of thumb one after another based on said signals to determine the degrees to which said series of rules of thumb are satisfied;

determining a speed ratio position which the automatic transmission should take in response to the degrees determined and generating an output signal indicative of said speed ratio position determined;

sampling each of said series of signals and calculating a variance of the data sampled for each of said series of signals;

comparing the variance of the data sampled for each of said series of signals with a predetermined reference;

modifying at least one of said series of membership functions of at least one of said series of rules of thumb when the variance is less than said predetermined reference; and shifting responsive to said output signal the automatic transmission to said speed ratio position indicated by said output signal.

5. In a fuzzy-logic controlled automatic transmission of a motor vehicle:

a series of detector means for detecting parameters indicative of running conditions which the motor vehicle is involved in and generating a series of signals indicative of said parameters detected;

a fuzzy-logic controller receiving said series of signals indicative of said parameters detected, said fuzzy-logic controller containing a series of rules of thumb, each being expressed by a series of membership functions of said signals and recommending an action which the automatic transmission should take, testing said series of rules of thumb one after another based on said signals to determine the degrees to which said series of rules of thumb are satisfied, determining a speed ratio position which the automatic transmission should take in response to the degrees determined and generating an output signal indicative of said speed ratio position determined, modifying at least one of said series of membership functions of at least one of said series of rules of thumb when the history of at least one of said series of signals shows a predetermined states; and means responsive to said output signal for shifting the automatic transmission to said speed ratio position determined by said output signal.

6. In a fuzzy-logic controlled automatic transmission of a motor vehicle, comprising:

a series of detector means for detecting parameters indicative of running conditions which the motor vehicle is involved in and generating a series of signals indicative of said parameters detected;

a fuzzy-logic controller receiving said series of signals indicative of said parameters detected, said fuzzy-logic controller containing a series of rules of thumb, each being expressed by a series of membership functions of said signals and recommending an action which the automatic transmission should take, testing said series of rules of thumb one after another based on said signals to determine the degrees to which said series of rules of thumb are satisfied, determining a speed ratio position which the automatic transmission should take in response to the degrees determined and generating an output signal indicative of said speed ratio position determined, sampling each of said series of signals and calculating a variance of the data sampled for each of said series of signals, comparing the variance of the data sampled for each of said series of signals with a predetermined reference, and modifying at least one of said series of membership functions of at least one of said series of rules of thumb when the variance is less than said predetermined reference.

* * * * *